Oct. 26, 1965     A. J. DREW ETAL     3,214,609
HALL EFFECT APPARATUS
Filed Dec. 10, 1962

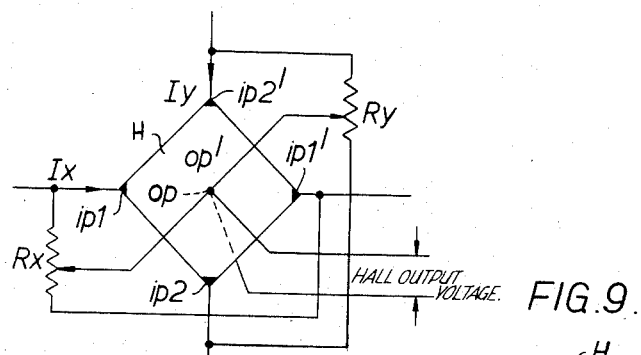
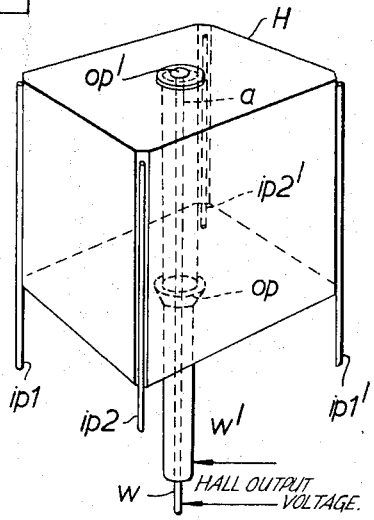
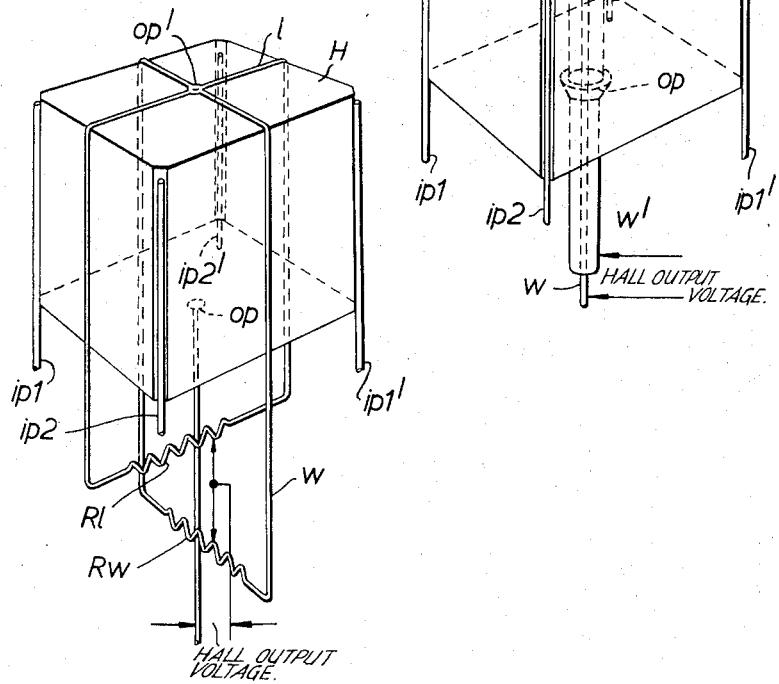

Oct. 26, 1965 A. J. DREW ETAL 3,214,609
HALL EFFECT APPARATUS
Filed Dec. 10, 1962 3 Sheets-Sheet 3

United States Patent Office 3,214,609
Patented Oct. 26, 1965

3,214,609
HALL EFFECT APPARATUS
Anthony John Drew, Sidcup, Kent, and Robert Keith Portway Galpin, London, England, assignors to Associated Electrical Industries Limited, London SW. 1, England, a British company
Filed Dec. 10, 1962, Ser. No. 243,550
Claims priority, application Great Britain, Dec. 20, 1961, 45,636/61
15 Claims. (Cl. 307—88.5)

Our copending application No. 160,746 describes a method of inter-modulating two alternating current signals by subjecting to a rotating magnetic field produced by different phases of one of said signals a three-dimensional body, as distinct from a plate or lamina of material exhibiting the Hall effect (referred to as a Hall effect prism and herein so termed), and generating a rotating electric field in the prism by the application thereto in different phases of the other of said signals, the modulation product of the said two signals being included in the resulting Hall output voltage obtained from the Hall effect prism.

According to the present invention a compact apparatus which can be used for such intermodulation comprises a magnetizing structure energizable to produce in a region bounded by the structure two intersecting magnetic fields substantially perpendicular to each other, together with Hall effect prism located in said region for subjection to said intersecting magnetic fields and having two pairs of input electrodes lying along respective lines normal to each other in a plane through said region, and a pair of output electrodes lying along a line transverse to said plane.

In carrying out the invention the magnetizing structure may include a magnetic body of toroidal, rectangular, or other closed form bounding said region, with magnetizing windings carried thereon in positions appropriate for the production of said intersecting magnetic fields. For instance in the case of a toroidal magnetic body the magnetizing windings may consist of two pairs of coils carried thereon at diametrically opposed positions on respective diameters normal to each other and wound either toroidally or with radial magnetic axes; or the coils may be arranged in overlapping quadrature relationship around the toroidal magnetic body in similar fashion to the field coils in some electric motors. The closed magnetic body may also have two pairs of salient pole-pieces disposed on lines normal to each other with the pole-pieces of each pair extending inwardly towards but terminating short of each other, said region in which the Hall effect prism is located being bounded by the inner ends of these pole-pieces. Where such salient pole-pieces are provided on a toroidal magnetic body the two pairs of coils may be carried respectively on the two pairs of pole-pieces instead of on the toroidal portion of the body. In the case of a rectangular magnetic body having such salient pole-pieces, the magnetizing windings may all be carried on two opposite limbs thereof and arranged as at least two pairs of coils effective for producing the two intersecting magnetic fields in said region bounded by the inner ends of the pole-pieces.

Alternatively, a magnetizing structure according to the invention may simply comprise two coils constituting said magnetizing windings and carried by the Hall effect prism with their magnetic axes perpendicular to each other. The prism with the two coils thereon may be accommodated in a casing of ferrite or other magnetic material which affords a low reluctance return path for the field flux produced by the coils and provides screening.

By applying in-quadrature phases of an alternating current signal as energizing currents to the magnetizing windings of apparatus conforming to the invention, the resultant of the two intersecting magnetic fields which are produced is a rotating magnetic field to which the Hall effect prism is subjected. Also, by applying to the two pairs of input electrodes respective in-quadrature phases of another alternating current signal a rotating electric field is generated in the prism. As a consequence, the resulting Hall output voltage obtained from the prism at the output electrodes contains the required modulation product of the two alternating current signals.

Due to the practical difficulty of accurately aligning the output electrodes at equipotential points in the rotating electric field, a leak component of the alternating current input producing this field may be present at the output electrodes as well. As the Hall output voltage is usually a very small value, the misalignment would not have to be very large before the level of the leak component became considerably greater than the level of the Hall output voltage. The apparatus of the invention may therefore include means for minimizing this leak component at the output electrodes.

Another leak component which may also appear at the output electrodes is that due to the magnetic input to the Hall effect prism, this latter leak component stemming from two possible sources. The first source is due to the effect of magneto-resistance, where the internal resistance of the Hall effect prism is found to vary with the strength of the rotating magnetic field. However, in practice this variation has been found to be small and may therefore be neglected. The second source, which may be much more serious, is the E.M.F. induced in the output circuitry connected to the output electrodes of the prism. Accordingly, the apparatus of the invention may also include means for minimizing this latter leak component of the magnetic input.

In order that the invention may be more fully understood reference will now be made by way of example to the accompanying drawings in which:

FIG. 8 illustrates diagrammatically a preferred means for minimizing at the output electrodes of the Hall effect prism any leak component arising from alternating current input;

Figure 11:
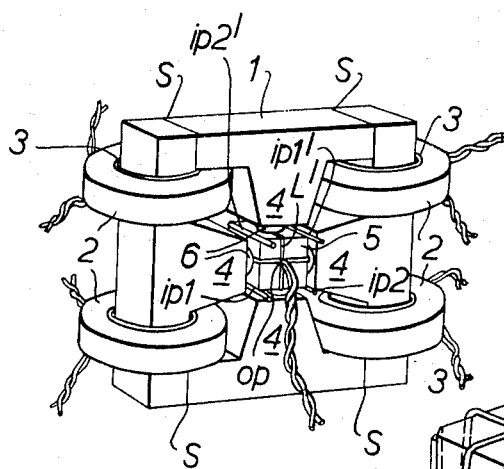
Figure 13:
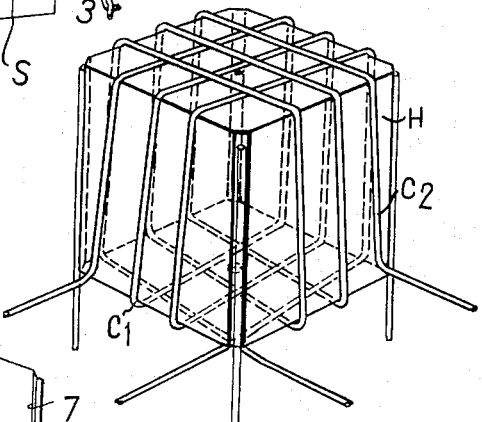
Figure 12:
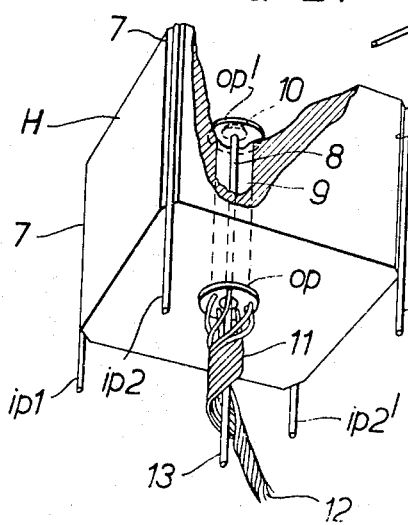
Figure 14:
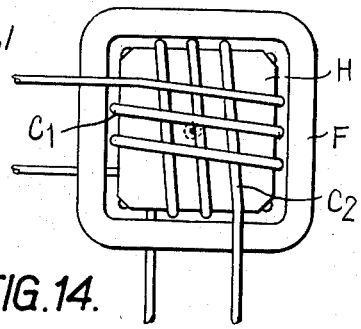

FIGS. 9 and 10 illustrating diagrammatically two possible ways for minimizing at the output electrodes of the Hall effect prism any leak component induced there by the magnetic input;

FIG. 11 is a perspective view showing an apparatus conforming to the invention in greater detail;

FIG. 12 is an enlarged perspective view, partly broken away, of an alternative form of Hall effect prism for the apparatus of FIG. 11;

FIG. 13 illustrates diagrammatically an apparatus having coils carried on the Hall effect prism itself; and FIG. 14 shows the apparatus of FIG. 13 fitted into an open-ended magnetic casing.

Figure 1:
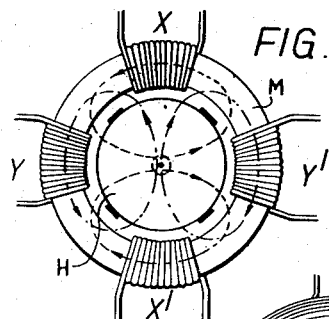
FIGS. 1–7 illustrate diagrammatically different possible form of apparatus conforming to the invention including a magnetic body.
Figure 2:
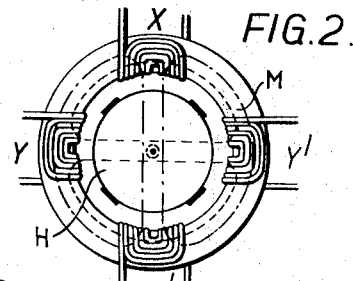
Figure 3:
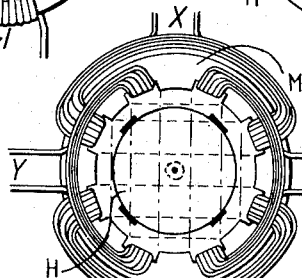

Referring to the drawings, in each of FIGS. 1–7 the apparatus there shown comprises a closed magnetic body M carrying energizing coils (X, X' and Y, Y' in FIGS. 1–6 and C in FIG. 7) and having a Hall effect prism H located in a central region thereof. In FIGS. 1, 2 and 3 the magnetic body M is of toroidal shape and the Hall effect prism H is of circular cross-section. The coils X, X' and Y, Y' in FIG. 1 are wound toroidally, whereas in FIG. 2 they are wound with radial axes. In each case, the application of in-quadrature phases of an alternating current signal to coils X, X' and Y, Y' respectively will result in the generation of a rotating magnetic field within the toroidal magnetic body M. The magnetic body M of FIG. 2 may have its inner peripheral surface castellated to accommodate the coils. The toroidal magnetic body M shown in FIG. 3 is also castellated, the coils X, X' and Y, Y' being fitted in slots rather like the field coils in some electric motors. In this instance the uniformity of the magnetic field produced by applying in-quadrature phases of an alternating current signal to the coils is controlled by distributing the turns of the coils between the slots.

Figure 4:
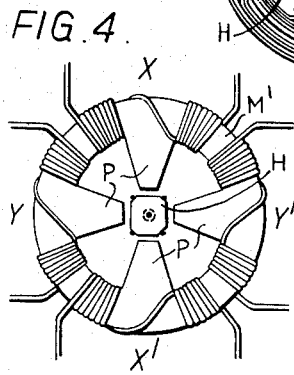
Figure 5:
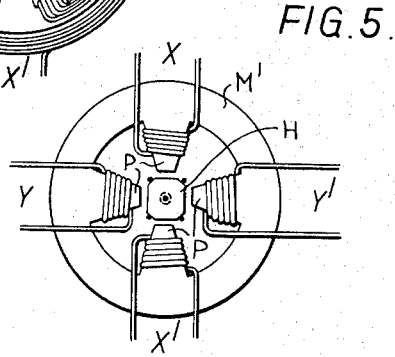
Figure 6:
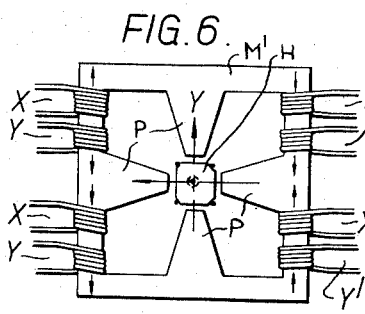
Figure 7:
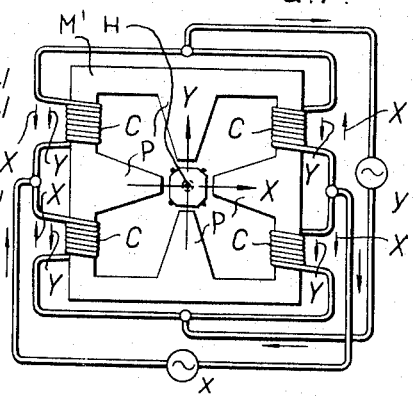

To produce a high flux density at the central region of a closed magnetic body where the Hall effect prism is located, there may be provided on the magnetic body M, as shown in FIGS. 4–7, two pairs of inwardly extending salient pole-pieces P. In FIG. 4 the coils X, X' and Y, Y' are wound toroidally as before, whereas in FIG. 5 they are wound on the salient pole-pieces P themselves. Instead of being of basically toroidal shape, the magnetic body M may be rectangular as shown in FIGS. 6 and 7. Two further ways of arranging the energizing coils and of feeding energizing currents to them are exemplified in these latter two figures. The basic difference between these two ways is that in FIG. 6 two sets of X, X' coils and two sets of Y, Y' coils are provided, whereas in FIG. 7 four coils C have their windings interconnected to form a bridge so that all these windings are energized in common by alternating current sources X and Y which supply in-quadrature energizing currents. However, the resultant effect in each case is the same: in FIG. 6 the currents in the X or X' coils and Y or Y' coils produce fluxes which depending on their local directions, as indicated by the arrows, add or subtract, whereas in FIG. 7, in which again the direction of the fluxes are indicated by arrows, the addition and subtraction is effected on a current basis in the coils C themselves.

A Hall effect prism (H) for the apparatus of the invention will now be considered in detail. The prism is shown in FIGS. 8–10 and is assumed to be a cube of semiconductor material, suitably germanium, having two pairs of input electrodes $ip1$, $ip1'$ and $ip2$, $ip2'$ attached respectively to its diagonally opposite corners, and a pair of output electrodes $op$, $op'$ attached at the centre of the opposite surfaces of the prism which lie normal to the input electrodes.

As shown in FIG. 8, a variable resistance $Rx$ may be connected across one pair of input electrodes in respect of one in-quadrature phase of applied signal current $Ix$, and a variable resistance $Ry$ may be connected across the other pair of input electrodes in respect of the other in-quadrature phase of applied signal current $Iy$, the adjustable taps of these two resistance being connected in common to one of the output electrodes. By suitable adjustment of the position of their taps these variable resistances $Rx$ and $Ry$ serve to minimize the previously mentioned input current leak component which can appear at the output electrodes as a result of any misalignment thereof.

In order to minimize the previously mentioned leak component of the magnetic input appearing at the output electrodes, output connections as shown in FIG. 9 or FIG. 10 may be employed. With the output connections of FIG. 9, for which the Hall effect prism P is provided with a small aperture $a$ which extends between the output electrodes $op$, $op'$, an output conductor $w$ is threaded through the aperture $a$ and connected to the output electrode $op'$, this conductor passing through, but being insulated from the other output electrode $op$ which is in the form of a ring surrounding the aperture $a$, while a second output conductor $w'$ is connected to the ring electrode $op$. Preferably the conductor $w'$ is in the form of a sheath which surrounds the conductor $w$ external to the prism P. In this way, the centre conductor $w$ is screened at first by the prism P and then by the sheath conductor $w'$, so that any signal induced therein from the magnetic input can be expected to be small.

As an alternative to the output connections shown in FIG. 9, which aim at keeping the E.M.F. induced in to the conductor $w$ to a minimum, output connections such as shown in FIG. 10 may be employed which aim at balancing out the induced E.M.F. by arranging the conductor $w$ as a loop in which the E.M.F. is induced in opposite sense. These output connections are not so elegant as those of FIG. 9, but by the use of variable resistance $Rw$ and $Rl$, the centre taps of which are commoned as shown, a high degree of cancellation can be achieved.

The detailed apparatus of the invention which is shown in FIG. 11 comprises a rectangular magnetic body 1, of the form illustrated in FIG. 6, which is divided along the lines 'S' into four portions to facilitate mounting of the coils 2. The coils 2 are wave-wound on cylindrical formers 3 of insulating material; end cheeks (not shown) may be added to these formers 3 if required. Inwardly extending pole-pieces 4 of the magnetic body 1 serve, as aforesaid, to concentrate the rotating magnetic field produced on energization of the coils 2 towards a cube-shaped Hall effect prism 5 of semi-conductor material, suitably germanium, which is located between the front faces of the pole-pieces 4. To protect the prism 5 against physical shock soft buffers 6, of neoprene for example, may be inserted between the prism 5 and the pole-faces. Input electrodes $ip1$, $ip1'$ and $ip2$, $ip2'$ are attached to diagonally opposite corners of the prism 5, while output electrodes $op$ and $op'$ (not seen in the present perspective view) are attached to opposite surfaces of the prism 5 which lie normal to the input electrodes. As indicated by the crossed lines L, the prism 5 is assumed to have output connections of the form considered with reference to FIG. 10.

FIG. 12 shows in some detail for a cube-shaped Hall effect prism H a preferred input electrode arrangement, together with output electrodes and output connections of the form considered with reference to FIG. 9. As regards the input electrode arrangement, large area current contacts 7 are ohmic contacts attached to the four parallel corners of the prism H which have been chamfered to receive the contacts 7. Conductor wires of a suitable material, for example gold with ½% gallium for use with p-type germanium, constituting the input electrodes $ip1$, $ip1'$ and $ip2$, $ip2'$ are soldered along the full length of each ohmic contact 7.

For providing the output connections, a hole 8 is drilled centrally through the prism H parallel to the contacts 7. Ohmic ring contacts constituting the output electrodes $op$, $op'$ are formed around each end of the hole 8. An insulated lead-out wire 9, is passed through the hole 8 and joined by solder 10 to the electrode $op'$, while a number of further lead-out wires 11 are joined at spaced position about the electrode $op$. These latter wires 11 are wound in helical fashion about the wire 9 to form a coaxial sheath therefor. Ends 12 and 13 of the wires 11 and the central wire 9, which are also suitably of indium, constitute the Hall output voltage terminals.

In the apparatus shown in FIGS. 13 and 14 a magnetic body carrying the energizing coils has been dispensed with and two energizing coils C1 and C2 are wound directly on the Hall effect prism H perpendicular to each other. In FIG. 14 the prism H with the coils C1, C2 wound thereon is fitted into an open-ended casing F of ferrite or other magnetic material which affords a low reluctance return path for the field flux produced by the coils C1 and C2 and provides screening. The prism H may have any of the input and output electrode arrangements already described.

By having the energizing coils wound directly on to the Hall effect prism a large reduction in the overall size of the apparatus is achieved. Also since the energizing coils used for this latter form of apparatus can be kept small, the apparatus should be particularly suitable for high frequency operation necessitating H.F. magnetic fields for which small flux densities to minimize eddy current heating, and low winding capacitances, require small coils.

What we claim is:

1. Apparatus comprising a magnetizing structure energizable to produce in a region bounded by the structure two intersecting magnetic fields substantially perpendicular to each other, together with a Hall effect prism located in said region for subjection to said intersecting magnetic fields and having two pairs of input electrodes each pair of input electrodes having portions thereof disposed in lines lying in a plane through said region, said plane being perpendicular to the longitudinal axis of the prism and passing through the magnetizing structure, the lines passing through portions of each pair of input electrodes being normal to each other, and a pair of output electrodes lying along a line transverse to said plane.

2. Apparatus as claimed in claim 1 wherein the magnetizing structure includes a magnetic body of closed form bounding said region, with magnetizing windings carried thereon in positions appropriate for the production of said intersecting magnetic fields.

3. Apparatus as claimed in claim 2 wherein said magnetic body is toroidal and the magnetizing windings consist of two pairs of coils carried thereon at diametrically opposed positions on respective diameters normal to each other.

4. Apparatus as claimed in claim 3 wherein said coils are wound toroidally on the toroidal magnetic body.

5. Apparatus as claimed in claim 3 wherein said coils are wound on the toroidal magnetic body with radial magnetic axes.

6. Apparatus as claimed in claim 3 wherein said coils are arranged in overlapping quadrature relationship around the toroidal magnetic body.

7. Apparatus as claimed in claim 2 wherein said magnetic body of closed form has two pairs of salient pole-pieces disposed on lines normal to each other with the pole-pieces of each pair extending inwardly towards but terminating short of each other, said region in which the Hall effect prism is located being bounded by the inner ends of these pole-pieces.

8. Apparatus as claimed in claim 7 wherein the magnetic body is toroidal and the magnetizing windings consist of two pairs of coils wound toroidally on the toroidal portion of the body at diametrically opposed positions on respective diameters normal to each other.

9. Apparatus as claimed in claim 7 wherein the magnetic body is toroidal and the magnetizing windings consist of two pairs of coils carried respectively on the two pairs of pole-pieces.

10. Apparatus as claimed in claim 7 wherein the magnetic body is of closed rectangular form and carries on two opposite limbs thereof magnetizing windings arranged as at least two pairs of coils effective for producing the two intersecting magnetic fields in said region bounded by the inner ends of the pole-pieces.

11. Apparatus as claimed in claim 1 wherein the magnetizing structure comprises two coils constituting said magnetizing windings and carried by the Hall effect prism with their magnetic axes perpendicular to each other.

12. Apparatus as claimed in claim 11 wherein the prism with the two coils thereon is accommodated in a casing of ferrite or other magnetic material.

13. Apparatus as claimed in claim 1 including potentiometer means for minimizing at the output electrodes of the Hall effect prism any alternating current input leak component, said potentiometer means comprising two potentiometers connected respectively across the two pairs of input electrodes and having adjustable tapping points connected in common to one of the output electrodes.

14. Apparatus as claimed in claim 1 wherein, for minimizing at the output electrodes of the Hall effect prism any leak component arising from the magnetic input, the Hall effect prism is formed with an aperture which extends between the output electrodes hereof, a first output conductor for the prism is connected to one of the prism output electrodes and threaded through the aperture, the other prism output electrode is in the form of a ring surrounding the aperture, and another output conductor in the form of a sheath surrounding the first externally of the prism is connected to this ring electrode.

15. Apparatus as claimed in claim 1 wherein, for minimizing at the output electrodes of the Hall effect prism any leak component arising from magnetic input, one of said output electrodes has an output conductor arranged as two loops lying normal to each other about the Hall effect prism, the loops including respective potentiometers having adjustable tapping points which are connected together and to a lead-out connection.

References Cited by the Examiner
UNITED STATES PATENTS 2,649,569  8/53  Pearson _____ 307—88.5
2,852,732  9/58  Weiss _____ 324—45

ARTHUR GAUSS, *Primary Examiner.*